Dec. 26, 1950  F. E. PAYNE  2,535,694
SELF-SEALING COUPLING
Filed July 6, 1946
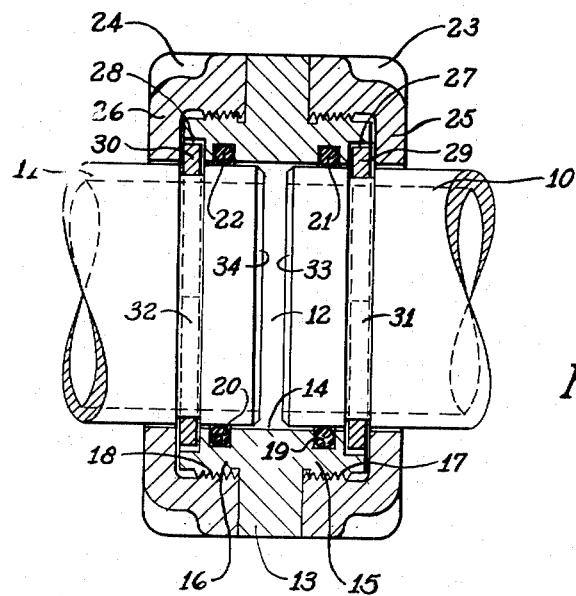
Fig.1.
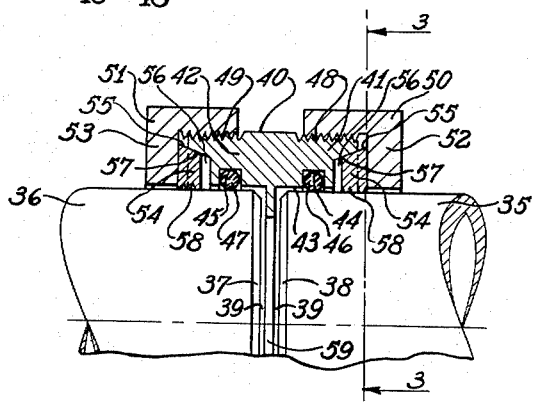
Fig.3.                                    Fig.2.
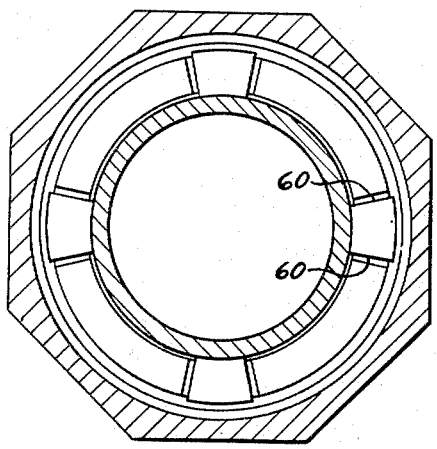
INVENTOR.
Frank E. Payne
BY
Charles F. Vojtech
Atty.

Patented Dec. 26, 1950

2,535,694

UNITED STATES PATENT OFFICE 2,535,694

SELF-SEALING COUPLING

Frank E. Payne, Glencoe, Ill., assignor to Crane Packing Company, Chicago, Ill., a corporation of Illinois Application July 6, 1946, Serial No. 681,674

3 Claims. (Cl. 285—193)

This invention relates to couplings for pipes, rods, shafts and the like and particularly to such couplings which do not require that the adjoining ends of the pipes be threaded.

The principal object of this invention is to provide a pipe coupling which effects a seal between the pipe and coupling through the use of an endless resilient deformable ring having a circular radial cross-section.

A specific object of this invention is to provide a coupling which utilizes a ring of hard material as an abutment to prevent the pipe from sliding relative to the coupling and a resilient deformable ring of rubber or rubber-like material for effecting a fluid-tight seal between the coupling and pipe. Alternatively, this invention contemplates utilizing a plurality of grippers in place of the ring to act as an abutment.

A more specific object of this invention is to provide a coupling which utilizes readily available resilient deformable rings for effecting a fluid-tight seal between the pipe and coupling, said rings being so formed as to be subject to the pressure of the fluid within the pipe, thereby increasing the sealing effect with increase in fluid pressure. These and other objects and features of this invention will become apparent from the following detailed description when taken together with the accompanying drawings, in which Fig. 1 is a section through a coupling embodying the present invention;

Fig. 2 is a modification of the coupling shown in Fig. 1 wherein thinner walls for the pipe may be utilized; and Fig. 3 is an elevation of the coupling taken along line 3—3 of Fig. 2.

Referring now to Fig. 1 for a detailed description of the invention, the ends of two pipes 10 and 11 are shown adjacent one another with a small space 12 therebetween to allow for slight movement between the pipes and also to permit the fluid under pressure within the pipe to pass upwardly to the interior of the coupling. The coupling itself is comprised of a central section 13 having an inner bore 14 which is slightly larger than the outside diameter of pipes 10 and 11. Said central section 13 bridges the space 12 and is formed with laterally extending shoulders 15 and 16 telescoping over the ends of the pipes, the outer surfaces of the shoulders being threaded as at 17 and 18, respectively. Each shoulder 15 and 16 is formed with an inner square groove 19 and 20, respectively, to receive sealing rings 21 and 22 respectively. Counterbores 27, 28 are formed at the ends of the shoulders to provide spaces for the locking means hereinafter described.

The fluid seal between the pipe ends and the central section 13 of the coupling is effected by the aforementioned sealing rings 21 and 22. These rings are made of resilient deformable material such as rubber, either synthetic or natural or a combination of the two, the material of the ring being selected so as to be resistant to the fluid within the pipe to be coupled. The material must be such that it will not deteriorate unduly when immersed in the fluid. The radial cross-section of each sealing ring 21 and 22 is originally circular but when the ring is installed it wi'l be compressed between the pipe and the cylindrical wall or bottom of each groove, thereby providing an initial seal for preventing the leakage of fluid whether or not the fluid is under pressure. When the fluid is under pressure the contour of the sealing rings 21 and 22 is such that the pressure of the fluid will tend to effect a tighter seal between the rings, the coupling and the pipe ends. The sealing rings 21 and 22 are available commercially and are known as O rings.

On either side of central section 13 are flanged nuts 23 and 24, the flange on each nut extending radially inwardly as at 25 and 26, respectively, towards the pipes 10 and 11. A small clearance is provided however between the pipes and the flanges 25 and 26 so as to allow for some angularity between the pipe and coupling.

The means for preventing a pipe end from being withdrawn from the coupling comprises split rings 29 and 30 of metal, plastic or the like which extend radially outwardly into the spaces 27 and 28, respectively, between the flanges 25 and 26 and the central section and also extend radially inwardly into grooves 31 and 32 cut or otherwise formed in the pipe ends 10 and 11. As shown in the drawing, the rings are rectangular in radial cross-section and have axial clearance in both the grooves and in the spaces 27 and 28. The axial clearance is provided to allow for some angularity between the pipe ends so that if the pipe line is a long one and curved, each pipe section may be positioned at a slight angle with respect to the adjoining pipe section to give the desired curvature to the pipe line.

It is apparent that since the rings 29 and 30 extend into the grooves and into the spaces 27 and 28 they will act as abutments to lock the pipe ends to the coupling and thus form a nonseparable union between adjacent pipes.

The coupling is installed as follows:

The ends of adjacent pipe sections to be coupled are grooved either on the site or by the pipe manufacturer. Next, the nuts 23 and 24 are slid over the grooved ends of the pipe beyond the grooves themselves and the rings 29 and 30 are expanded over the ends of the pipe and moved over the pipe until they contract into their respective grooves. Since the metallic rings 29 and 30 are split they can be expanded and contracted as described. It is understood of course that alternatively the rings may be comprised of two semi-circular sections which will be retained in their grooves during the installation of the coupling by the central section, the counterbores 27, 28 therein being of such size as to prevent the sections from falling out during assembly.

With the locking rings 29, 30 in place the resilient deformable rings 21 and 22 are inserted into the grooves 19 and 20 in the central section 13 and the section is then slid over the end of one of the pipes such as 10 for example while the adjacent pipe end 11 is slid axially into the overhanging end of central section 13. In sliding the central section over the pipe ends the resilient deformable rings 21 and 22 will be expanded into their grooves by reason of the fact that the internal diameter of each of the rings 21 and 22 is slightly smaller than the outside diameter of the pipe. The expansion of rings 21 and 22 is facilitated by beveled edges 33 and 34 on the ends of the pipe. The final step is to tighten nuts 23 and 24 on the threaded shoulders 15 and 16 of the central section until the nuts abut the said central section 13.

It will be noted that the Fig. 1 form of coupling requires that the pipe ends be grooved to receive the rings 29 and 30. This requires of course that the thickness of the pipe wall be sufficiently large so that after the pipe is grooved there still remains sufficient metal in the pipe wall to withstand the pressures encountered within the pipe. The grooving is also an extra operation which in some cases may be undesirable. The form of coupling shown in Fig. 2 is therefore especially adapted for thinner walled pipe and does not require that the pipe ends be grooved.

Referring now particularly to Figs. 2 and 3, the ends of two adjoining pipes 35 and 36 are shown, said ends having continuous outer surfaces unbroken by grooves or the like and having beveled edges 37 and 38 respectively. The pipe ends are slightly separated to form a space 39 therebetween thereby permitting one pipe to be placed at a slight angle with respect to the other.

The coupling itself is comprised of a central section 40 having lateral shoulders 41 and 42 and an internal bore 43 which is slightly larger in diameter than the outside diameter of pipes 35 and 36 so as to permit a certain degree of freedom of movement between the central section and the pipe ends. A pair of square grooves 44 and 45 are machined into said bore 43 approximately the same distance apart as grooves 19 and 20 in Fig. 1. Located within grooves 44 and 45 are resilient deformable rings 46 and 47, respectively, which may be identical in every respect with rings 21 and 22 of Fig. 1. The outer surfaces of the shoulders 41 and 42 on central section 40 are threaded as at 48 and 49. A pair of tightening nuts 50 and 51 having radially inwardly directed flanges 52 and 53, respectively, cooperate with threads 48 and 49 on the central section 40 to advance axially with respect thereto. The central section is located on the pipes by means of an internal rib 59.

Between the flanged nuts 52 and 53 and the central section 40 are located grippers 54 (Figs. 2 and 3) preferably made of hardened steel or the like, said grippers having outer tapered surfaces 55. The grippers 54 are disposed in notches 56 formed in the ends of the central section 40, the notches having similarly tapered surfaces 57 against which the grippers are pressed by flanges 52 and 53. As the nuts 50 and 51 are advanced upon central section 40, grippers 54 are pressed radially inward upon the outside surface of each pipe to form a wedge. They are restrained from rotating with the nuts by the sides of the notches. It is apparent therefore that the portion of the central section extending between two grippers constitutes a means for preventing or limiting circumferential movement of the grippers and may take other forms. It will be noted that a clearance is provided between each gripper and the bottom of a recess to permit the gripper to advance axially while the central section remains axially stationary. The grippers 54 will thus grip the pipe frictionally and resist relative axial movement between the pipe and coupling. To increase the holding power of the grippers the interior surfaces thereof may be serrated with a knurling tool, or it may be formed with sharp pointed ridges or with threads as shown at 58.

The circumferential length of each gripper 54 is made sufficiently small to provide a concentrated load on the surface contacting the pipe. Since the central section between the grippers will provide a reinforcement of the pipe in case of distortion, a considerable gripping force is permissible which makes for a tight coupling. The side surfaces 60 of the grippers may be radially disposed as shown or may be parallel (not shown) if desired for ease of manufacture.

The installation of the coupling shown in Fig. 2 differs somewhat from that practiced in connection with the Fig. 1 form. In the Fig. 2 form, the central section 40 with the rings 46 and 47 assembled in their respective grooves is slipped over the end of one pipe until locating rib 59 strikes the end thereof. The grippers 54 are then placed into the notches on one side and the nut for that side is brought up sufficiently tight to hold the grippers in place. Next, the other pipe end is pushed into the central section 40 until it is stopped by rib 59. The grippers for that side of the central section are placed in their respective notches 56 and the nut on that side is tightened until the grippers hold the pipe firmly in the coupling. The first-mentioned nut is then tightened to the same degree.

Thus in both Fig. 1 and Fig. 2 forms a fluid-tight pressure-responsive seal is effected between two pipe ends and a coupling with the use of simple and readily available parts. The resilient deformable rings are easily made and may in fact be purchased in the smaller sizes in the open market. The expansible metallic abutment rings of the Fig. 1 form are likewise readily manufactured and may be purchased in the open market. The remainder of the coupling is comprised of readily machined castings.

It is understood that the foregoing description is merely illustrative of preferred embodiments of this invention and that the scope of the invention therefore is not to be limited thereto but is to be determined by the appended claims.

What is claimed is:

1. A coupling for connecting pipe sections together, said coupling comprising a central section adapted to telescope over adjacent pipe ends, resilient deformable means positioned between the central section and pipe ends to form a fluid-tight seal therebetween, and means for preventing relative axial movement between the coupling and pipe ends, said means comprising a plurality of segmental grippers spaced about the periphery of the pipe ends, said grippers and central section having cooperating wedge surfaces for forcing the grippers radially inward when the grippers are advanced toward the central section, means on the central section for limiting relative circumferential movement between the grippers and central section, and means for advancing the grippers toward the central section, whereby to cause the grippers to engage and hold the pipe ends in the coupling.

2. A coupling as described in claim 1, the means for limiting circumferential movement of the grippers comprising axially disposed extensions on the central section interposed in the path of circumferential movement of the grippers.

3. A coupling for connecting together pipe sections, said coupling comprising a central section adapted to telescope over adjacent pipe ends, grooves on the interior of the central coupling section facing the outer periphery of the telescoped pipe ends, resilient deformable packing rings in the grooves, and means for preventing relative axial movement between the coupling and pipe ends, said means comprising a plurality of grippers spaced about the periphery of the pipe ends and having outer inclined surfaces, said central coupling section having notches to receive the grippers and said notches having inclined surfaces adapted to contact the inclined surfaces on the grippers, and threaded nuts on either side of the central coupling section and adapted to be drawn towards the said central section, said nuts having surfaces adapted to cooperate with the grippers to press said grippers against the inclined surfaces on the central section, whereby to compress said grippers against the pipe to prevent relative axial movement therebetween.

FRANK E. PAYNE.

REFERENCES CITED

The following references are of record in the file of this patent:

UNITED STATES PATENTS

| Number | Name | Date |
| --- | --- | --- |
| 661,352 | Moody | Nov. 6, 1900 |
| 682,250 | Glauber | Sept. 10, 1901 |
| 2,187,217 | Winslow | Jan. 16, 1940 |
| 2,346,051 | Seamark | Apr. 4, 1944 |

FOREIGN PATENTS

| Number | Country | Date |
| --- | --- | --- |
| 708,706 | France | May 4, 1931 |